Patented Jan. 2, 1951

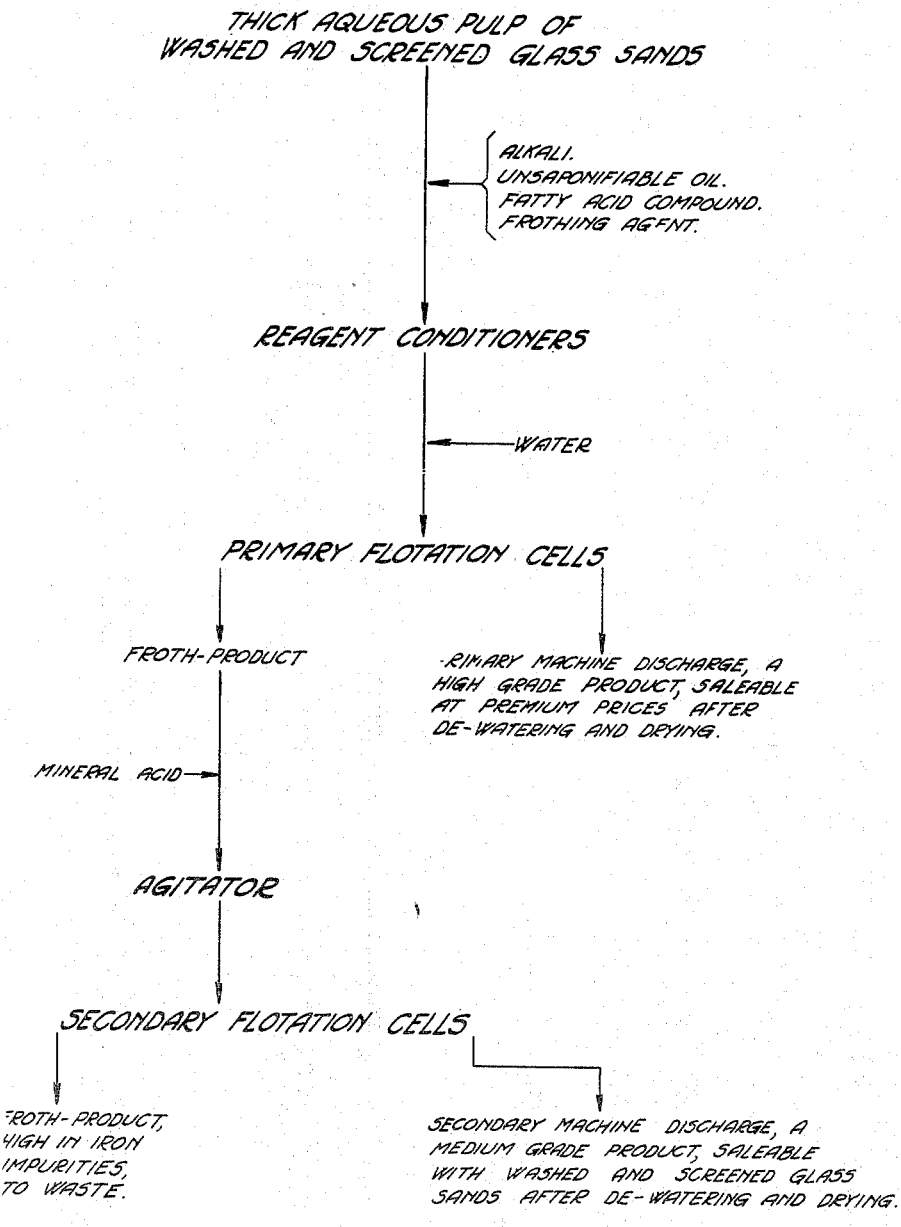

2,536,058

UNITED STATES PATENT OFFICE 2,536,058

METHOD OF TREATING GLASS SANDS

Wesley M. Houston, Lakeland, Fla., assignor to Minerals Separation North American Corporation, New York, N. Y., a corporation of Maryland Application July 13, 1949, Serial No. 104,550

9 Claims. (Cl. 209—166)

The present invention relates to a method of treating glass sands contaminated with ferruginous impurities. The general object of the invention is to produce from glass sands which have been washed and screened and are saleable although they contain considerable ferruginous impurities, a higher grade product saleable at a higher price because it contains a much lower percentage of ferruginous impurities; and a grade product which is comparable in iron content and may be mixed with the untreated glass sands without rendering the mixture unsaleable at the prices at which the washed and screened sands are customarily sold. By the methods hereinafter described, the desired end is accomplished without sending to waste any great percentage of the weight of the sands which are subjected to treatment. That is, the said methods produce a high-grade product (which is a high percentage of the sands treated) saleable at a premium price; and a grade product which may be mixed and sold with untreated sands at the lower price, or indeed, sold itself as a comparable product.

The method which is the present invention is characterized by first conditioning an aqueous pulp of the glass sands with cooperating agents consisting of a substantially insoluble and unsaponifiable oil, a fatty acid compound having a hydrocarbon radical of at least 12 carbon atoms, an alkali, and a frothing agent; then subjecting said conditioned pulp to froth-flotation treatment, thereby producing a froth-product rich in iron impurities and a residue (which is a high percentage of the sands treated) which is a high-grade purified glass sand saleable at a premium price; then conditioning said ferruginous froth-product in an aqueous pulp with a mineral acid; and subjecting that acid-treated pulp to froth-flotation treatment, thereby producing a froth-product (which is a low percentage of the total sands treated) very rich in iron impurities which is discarded, and a second residue or machine discharge which can be mixed with untreated glass sands and/or sold as a lower grade glass sand.

In practicing the method of the invention, the substantially insoluble and unsaponifiable oil may be fuel oil, lubricating oil, Diesel oil etc.; the fatty acid compound having a hydrocarbon radical of at least 12 carbon atoms may be tall oil, red oil (oleic acid), fish-oil fatty acid, etc.; the alkali may be sodium metasilicate, sodium hydroxide, etc.; and the frothing agent may be pine oil. The agents mentioned are merely examples of those that are useful in practicing the invention as it is hereinafter defined in the claims.

The drawing is the flow-sheet of the pilot plant in which the invention has been satisfactorily practiced.

The following examples illustrate the successful practicing of the method of the present invention on glass sands from the vicinity of Rockwood, Michigan. In all of the examples, the sands were washed and screened sands sized to pass a 28 mesh Tyler screen, and saleable to the glass industry after drying. Examples 1, 2 and 4 represent results obtained with laboratory batch testing utilizing a variety of flotation collectors of the fatty acid type, several different alkalies, and several different mineral acids for conditioning the primary ferruginous float. The third example represents the practice of the processes of the invention in a continuous pilot plant run.

*Example 1*

A 1000 gram batch of washed and screened glass sands was made into a thick aqueous pulp containing about 76% solids in a laboratory paddle type conditioner, to which while stationary was added sodium metasilicate in the amount of 0.5 lb. per ton of solids in the feed. Then agitation of the pulp was commenced, and to it were added: fuel oil 1.5 lbs., tall oil 1.5 lbs., and pine oil 0.2 lb., all per ton of solids in the screened feed. Agitation of the pulp was continued for about two minutes after the addition of the reagents. The thus conditioned pulp was then transferred to a Minerals Separation Laboratory Airflow Flotation machine, diluted with water, and subjected to a primary froth-flotation treatment, thereby producing a froth-product rich in iron impurities and a residue (machine discharge) which is the high grade purified glass sand. The said froth-product was then agitated in a thin aqueous pulp containing about 20% to 30% solids for about 30 seconds, after the addition to it of sulfuric acid in the amount of 0.2 lb. per ton of solids in the screened feed. This acid-treated pulp was then subjected to a secondary froth-flotation treatment which produced a froth-product rich in iron minerals which was discarded; and a residue which was the second machine discharge adapted to be mixed with untreated glass sands which are sold as a lower grade glass sand at a price less than the premium price commanded by the higher grade purified glass sand resulting from the first froth-flotation operation. The metallurgical results were as follows:

| Product | Per Cent Wt. | Per Cent Total Fe | Per Cent Total Fe Distribution |
|---|---|---|---|
| Feed | 100.0 | .0117 | 100.0 |
| Primary machine discharge, finished product | 83.6 | .0068 | 48.7 |
| Secondary machine discharge | 9.7 | .0147 | 12.0 |
| Froth-product to waste | 6.7 | .069 | 39.3 |

*Example 2*

In this example, the feed was prepared in the same way and the procedure was the same as in Example 1, but the agents employed, per ton of solids in the screened feed, were: sodium hydroxide 0.15 lb., fuel oil 1.5 lbs., red oil (oleic acid) 1.5 lbs., pine oil 0.2 lb., and nitric acid 0.2 lb. The metallurgical results were as follows:

| Product | Per Cent Wt. | Per Cent Total Fe | Per Cent Total Fe Distribution |
|---|---|---|---|
| Feed | 100.0 | .0116 | 100.0 |
| Primary machine discharge, finished product | 80.5 | .0058 | 40.5 |
| Secondary machine discharge | 12.9 | .0140 | 15.5 |
| Froth-product to waste | 6.6 | .078 | 44.0 |

*Example 3*

A thick aqueous pulp (about 70% solids) of washed and screened sands from the same source as described above was fed continuously, at the rate of 176 pounds (dry basis) per hour to two small paddle conditioners in series. The following reagents were added continuously to the pulp going to the conditioners at the rates listed as equivalent to the pounds per ton of dry solids in the pulp: 0.6 lb. of sodium meta silicate, 1.4 lbs. of fuel oil, 1.4 lbs. of tall oil and 0.1 lb. of pine oil. The conditioned sands were diluted with water and fed to a small continuous four cell Minerals Separation Airflow Flotation machine from which a primary machine discharge was taken, dewatered, and dried to produce a premium grade of glass sands containing only 0.007% total Fe. The froth-product from this primary flotation was continuously treated in a small paddle agitator with 2.6 lbs. of sulfuric acid per ton of original feed and then delivered to a small continuous two-cell Minerals Separation Airflow Flotation machine. This secondary flotation produced a final froth product, high in ferruginous impurities, which was discarded. The secondary machine discharge was dewatered and dried to produce medium grade glass sand which could be sold by itself or blended with additional washed and screened sand for sale as such. The metallurgical results of this continuous pilot plant test were as follows:

| Products | Lbs./Hour | Percent Total Fe | Percent Total Fe Distribution |
|---|---|---|---|
| Feed | 176 | 0.0140 | 100.0 |
| Primary machine discharge, finished product | 139 | 0.0070 | 39.3 |
| Secondary machine discharge | 26 | 0.0170 | 17.9 |
| Froth-product to waste | 11 | 0.093 | 42.8 |

*Example 4*

In this example, the feed was prepared in the same way and the procedure was the same as in Example 1, but the agents employed, per ton of solids in the screened feed, were: sodium hydroxide 0.15 lb., fish-oil fatty acid 1.5 lbs., fuel oil 1.5 lbs., pine oil 0.2 lb., and hydrochloric acid 0.2 lb. The metallurgical results were as follows:

| Product | Percent Wt. | Percent Total Fe | Percent Total Fe Distribution |
|---|---|---|---|
| Feed | 100.0 | .0110 | 100.0 |
| Primary machine discharge, finished product | 70.0 | .0050 | 31.8 |
| Secondary machine discharge | 20.9 | .0110 | 20.9 |
| Froth-product to waste | 9.1 | .057 | 47.3 |

From the foregoing examples, it will be apparent that the method of the invention results in the economical production, from glass sands which are saleable although they contain considerable ferruginous impurities, of higher grade glass sands which command a premium price; that only a small percentage of the weight of the screened feed is sent to waste; and that a secondary machine discharge is produced which can be mixed and sold with the original sands.

What is claimed is:

1. The process of treating washed and screened glass sands which consists in conditioning an aqueous pulp of such sands with cooperating agents consisting of a substantially insoluble and unsaponifiable oil, a fatty acid having a hydrocarbon radical of at least 12 carbon atoms, an alkali, and a frothing agent; subjecting said conditioned pulp to froth-flotation treatment thereby producing a froth-product rich in iron impurities and a residue which is a purified glass sand commanding a premium price; and then conditioning said ferruginous froth-product in an aqueous pulp with a mineral acid and subjecting that acid-treated pulp to froth-flotation treatment, thereby producing a froth-product rich in iron minerals which is discarded and a residue which is sufficiently poor in iron minerals to be sold as a washed and screened glass sand.

2. The process of treating washed and screened glass sands which consists in conditionining an aqueous pulp of such sands with cooperating agents consisting of a substantially insoluble and unsaponifiable oil, a fatty acid having a hydrocarbon radical of at least 12 carbon atoms, an alkali, and a frothing agent; subjecting said conditioned pulp to a froth-flotation treatment thereby producing a froth-product rich in iron impurities and a residue which is a purified glass sand commanding a premium price; and then conditioning said ferruginous froth-product in an aqueous pulp with a mineral acid and subjecting that acid-treated pulp to froth-flotation treatment, thereby producing a froth-product rich in iron minerals which is discarded and a residue in which the iron content is substantially the same as that in the original washed and screened glass sands.

3. The process defined in claim 1, employing sulfuric acid as the mineral acid.

4. The process defined in claim 1, employing hydrochloric acid as the mineral acid.

5. The process defined in claim 1, employing sodium meta silicate as the alkali.

6. The process of treating washed and screened glass sands which consists in conditioning a portion of said sands in a thick aqueous pulp with cooperating agents consisting of a substantially insoluble and unsaponifiable oil, a fatty acid having a hydrocarbon radical of at least 12 carbon atoms, an alkali, and a frothing agent; subjecting said conditioned pulp to froth-flotation treatment thereby producing a froth-product rich in iron impurities and a residue which is a purified glass sand commanding a premium price; and then conditioning said ferruginous froth-product in a thin aqueous pulp with a mineral acid, and subjecting that acid-treated pulp to froth-flotation treatment, thereby producing a froth-product rich in iron minerals which is discarded and a residue which is sufficiently poor in iron minerals to be mixed and sold with the original washed and screened glass sands.

7. The process defined in claim 6, employing sulfuric acid as the mineral acid.

8. The process defined in claim 6, employing hydrochloric acid as the mineral acid.

9. The process defined in claim 6, employing sodium meta silicate as the alkali.

WESLEY M. HOUSTON.

REFERENCES CITED

The following references are of record in the file of this patent:

UNITED STATES PATENTS

| Number | Name | Date |
| --- | --- | --- |
| 2,283,295 | Tartaran et al. | May 19, 1942 |
| 2,433,633 | Stokes | Dec. 30, 1947 |
| 2,461,875 | Booth et al. | Feb. 15, 1949 |